Jan. 2, 1968     E. C. TREXLER, JR     3,361,377
EXTENDIBLE-RETRACTABLE BOOM
Filed Dec. 30, 1965
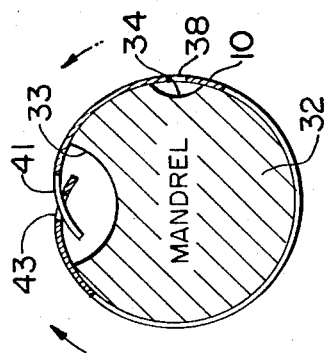
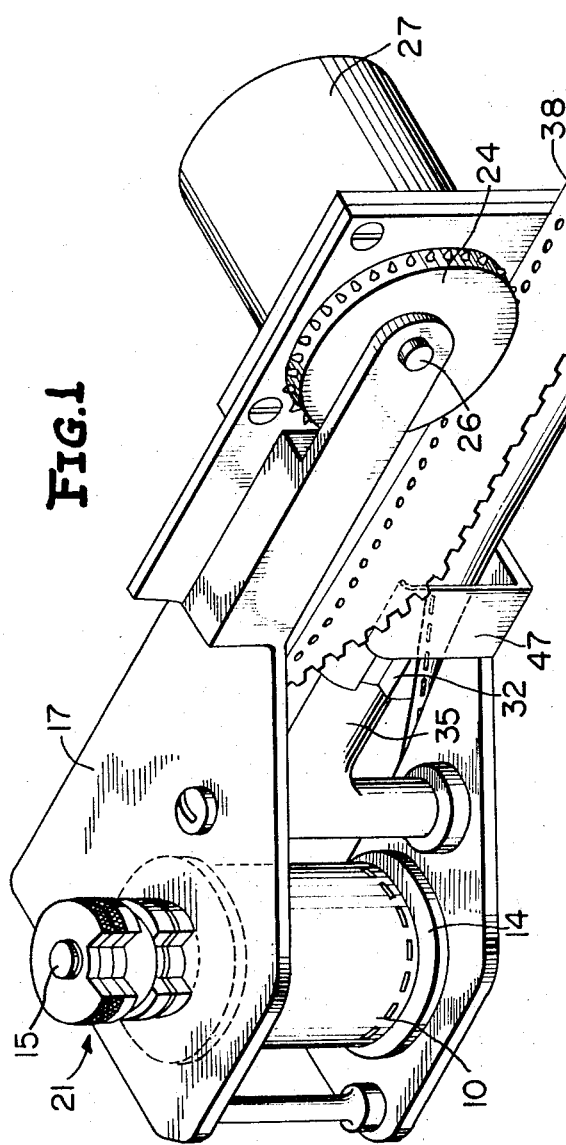
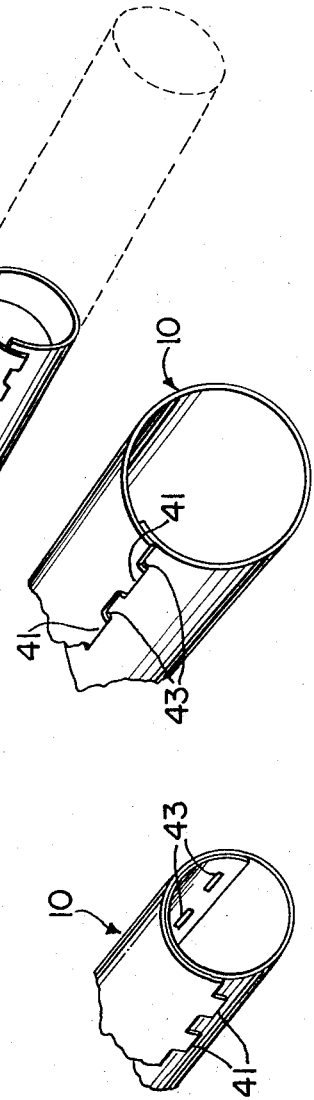
INVENTOR
EDWARD C. TREXLER, Jr.
BY *Hurvitz & Rose*
ATTORNEYS

United States Patent Office 3,361,377
Patented Jan. 2, 1968

3,361,377
EXTENDIBLE-RETRACTABLE BOOM
Edward C. Trexler, Jr., Fairfax, Va., assignor to Melpar, Inc., Falls Church, Va., a corporation of Delaware
Filed Dec. 30, 1965, Ser. No. 517,589
6 Claims. (Cl. 242—54)

The invention described herein was made in the performance of work under a NASA contract and is subject to the provisions of section 305 of the National Aeronautics and Space Act of 1958, Public Law 85–568 (72 Stat. 435; 42 U.S.C. 2457).

The present invention relates generally to extendible-retractable tubular booms and more particularly to booms which may be compactly stored and which are readily deployed as rigid, high strength structures.

As used in this application, the term "boom" refers to an elongate tubular structure, practical applications of which will appear presently.

It has long been known that an elongate strip of resilient material may be prestressed to assume tubular shape when unconfined and yet may be stored when opened flat, as a coil on a reel or drum in extremely compact form. The prestressing or preforming of the strip causes it to assume the tubular shape when unreeled from its storage drum—that is, the prestressed strip is effectively an extendible and collapsible boom—and the strip will continue to perform in this manner each time it is released despite repeated reeling or unreeling. A typical example of prior art collapsible booms is U.S. Patent No. 3,144,104, granted Aug. 11, 1964, to Weir et al.

The extendible-retractable boom concept is similar to that involved in the provision of a conventional extendible coiled metal tape rule, the stresses resulting in the concavo-convex configuration of the rule, whereby to provide it with greater rigidity when uncoiled, being provided during the fabrication process. Unlike the simple extendible rule, however, the larger strip which is to form the boom is subjected to sufficient prestressing to cause it to take a tubular shape whenever unconfined. Proposed applications of such a structure are as collapsible antennas for use in spacecraft or in more conventional mobile or portable communications systems, steady lines easily storable in aircraft for ground-to-air pickup of men and materials, readily elevatable and retractable antennas for use with communications systems in jungle environment, and radar reflectors for lifeboats, to name a few. Several problems, however, have been associated with the prior art structures, particularly in that seams, which must be of a temporary nature to permit recoiling, have not been sufficiently strong to provide the high rigidity necessary for the uses mentioned above; and in the provision of a reliable deployment system for the boom. In the previously mentioned Weir et al. patent the prestressed strip is provided with notched longitudinal edges for a tab-to-notch interlocking seam or joint. Such a joint lacks torsional rigidity and shear strength. Moreover, it is difficult to achieve desirable integrity of interlock between any large percentage of the tab-notch pairs as the strip is uncoiled from its storage or supply reel. A further problem resides in the provision of a reliable deployment or feed system which will assure proper extension and retraction, as each in turn is desired, and which will maintain the desired orientation of the boom throughout its extension.

It is accordingly a primary object of the present invention to provide an improved extendible-collapsible boom.

It is another object of the present invention to provide an improved deployment system for extendible-collapsible booms.

Briefly, in accordance with the present invention there is provided a resilient strip of the type described above, fabricated from a material appropriate to the particular application of interest, and which has been prestressed so that when unrestrained it will take the shape of a tube with an axis in the longitudinal direction of the original strip. One longitudinal edge of the strip is provided with a series of tabs whose ends are slightly tapered relative to the remainder of the strip, while the opposite strip edge is provided with a series of slots so aligned as to accept the tabs when the strip is deployed from the drum on which it is coiled. The torsional rigidity of the deployed boom and the integrity of its interlock joint formed by the tab-slot engagement approaches that of a member of continuous cross-section.

The boom deployment system according to the present invention comprises a sprocket drive adapted for positive engagement with pre-formed mating holes in the strip to pull the latter from its storage drum as the boom is extended. In this manner the strip leaves the drum in tension rather than compression, thereby eliminating the need for special anti-buckling devices and insuring boom deployment in straight-forward fashion which precludes rotation. The deployment system further includes a mandrel which cooperates with the natural tendencies of the strip to produce positive interlock, and a braking device to counteract the torque of the flattened ribbon.

It is therefore a more specific object of the invention to provide an extendible-retractable boom having strength and rigity approaching those of a structural member of continuous cross-section.

Another object is to provide a deployment system whereby the boom is extended and retracted without a tendency to buckle or rotate and a positive interlock seam is maintained throughout the length of the extended boom.

The above and still further objects, features and attendant advantages of the present invention will become apparent from a consideration of the following detailed description of one specific embodiment thereof, especially when taken in conjunction with the accompanying drawings in which:

FIGURE 1 is a perspective view of one embodiment of the prestressed strip of the deployment system;

FIGURES 2a and 2b are perspective views of the strip in its natural preformed state and in its interlocked deployed state, respectively; and FIGURE 3 is a cross-sectional view of the forming mandrel and the boom.

Referring now to the drawings, a strip, ribbon, or tape 10 of suitable resilient material, such as beryllium copper, is prestressed or preformed in any conventional manner, as by rolling, to assume a tubular shape (FIG. 2a). The prestressed strip 10 is provided with a series of preferably equally spaced tabs 41 along one of its longitudinal edges and a like series of slots 43, longitudinally aligned with the tabs, along the opposite longitudinal edge.

In addition, strip 10 includes a plurality of equally spaced holes 38 (FIG. 1) which are disposed in longitudinal alignment toward the center of the strip for a purpose which will be discussed presently. In its prestressed state strip 10 tends to assume a tubular shape with a split circular cross-section (FIG. 2a). For reasons which will subsequently become clear, the diameter of the tube in its natural state is arranged to be smaller, by appropriate prestressing, than the diameter of the boom formed when the tabs and slots are in interlocking engagement.

Strip 10 is coiled in an open or flattened state on a supply drum or reel 14 rotatably coupled via shaft 15 to a frame 17. In the deployment system shown in FIGURE 1 the drum 14 is vertically oriented, but this is not critical and any desired orientation of the entire system to effect the extension and/or retraction of the boom may be employed depending upon the particular application of the system. A braking assembly 21 is provided on a portion of shaft 15 extending beyond frame 17 to counteract the torque of the flattened ribbon on drum 14. In the illustrative embodiment, assembly 21 is a conventional friction brake comprising a plurality of adjacent disks, those toward the end of the shaft being tapped to receive the threaded portion of the shaft. Since only the end portion of shaft 15 is threaded the plurality of disks may be tightened or loosened as required to provide the desired drag, while permitting drum 14 to rotate against this frictional drag during extension or retraction of the boom. To insure proper recoiling of strip 10 during retraction of the boom, an adjustable pressure arm or guide (not shown) may be attached to the frame to ride against the outermost layer of the coiled strip as it is wound upon or unwound from the drum.

Strip 10 is pulled from drum 14 during boom deployment, the drum rotating accordingly, by a sprocket drive wheel 24 which rotates on a shaft 26 driven by a reversible motor 27. To this end, the previously mentioned longitudinally aligned holes 38 in strip 10 are arranged to mate with the teeth disposed about the periphery of sprocket drive wheel 24. Forming mandrel 32, on which strip 10 rides during the boom-forming and boom-collapsing (retracting) operations, is provided with a pair of angularly spaced longitudinal notches 33 and 34, the first at the position where the interlock joint is formed, and the second smaller notch aligned immediately below holes 38 to permit passage of the sprocket drive teeth therethrough as the drive wheel is rotated by the motor. Motor 27 may be conventionally controlled from a remote location to extend or retract the boom, if desired. For purposes of retraction, however, it is necessary to add a motor drive (not shown) for drum 14 in order to over-ride the brake and rewind the strip or ribbon on the storage drum as it is propelled backward by the sprocket. The mandrel 32 is supported by a member 35 which may be secured to frame 17 in any suitable manner.

It is to be noted that a deployment system of the type shown in FIGURE 1 is highly advantageous over prior art deployment systems for several reasons. Among the more important advantages are the pulling of the prestressed strip from the drum and the continuous positive contact between strip and sprocket drive. By pulling the strip from supply drum rather than driving the drum, the strip leaves the drum in tension instead of compression and therefore is not susceptible to buckling. Hence, the necessity of using anti-buckling devices is eliminated. The continuous positive contact between the sprocket drive and the strip causes the boom to be deployed in straight-ahead fashion without undesirable rotation. After deployment, resistance to rotation is maintained by the torsional rigidity and high-strength characteristics of the boom structure itself.

As sprocket drive wheel 24 rotates in counter-clockwise fashion, strip 10 is fed onto forming mandrel 32 and the tabs 41 enter associated slots 43, the latter being appropriately dimensioned to accept the tabs in relatively close fitting relationship. An edge separator 47 is preferably employed to maintain the outside-inside relationship of tab edge and slot edge (i.e., tab over slot). The edge separator may be appropriately curved at its forward end (toward drive wheel 24) to prevent the tabs from hooking thereon as the boom is subsequently retracted. It will be understood, of course, that in certain cases, as in certain space vehicle applications, retraction of the boom may be unnecessary. Nevertheless, deployment systems in accordance with the present invention are capable of extension and retraction without any necessity of special modification to adapt the system to perform either operation.

Mandrel 32 is centrally located relative to the width of the strip 10 and perpendicular to the axis of storage drum 14 and to insure that each tab end is located at the center of its respectively associated slot at the point where interlock occurs. The natural inwardly curved shape of the tab end and the slot edge causes mating and entry to form the interlock joint. Alternatively, the tabs may be inwardly oriented at a slight angle to insure proper slot mating. As the strip leaves the mandrel it tends to return to its unrestrained cylindrical shape, further insuring proper interlock, and thus high strength and rigidity in the formed tubular boom, as a result of the internal elastic energy of the prestressed strip. It will now be seen that the provision of an unrestrained diameter, of the split circular cross-section tube formed by strip 10, smaller than the diameter of the interlocked boom is essential for proper interlock. First, it produces the inward curvature required for reliable tab entry, and second, it provides sufficient strain energy in the strip to force the tabs into the slots and to maintain a positive interlock joint at all times during boom extension. As an example, an unrestrained strip diameter of 0.6 inch has been used where a 0.75 inch diameter boom structure is to be formed. In general, then, the unrestrained diameter of the strip is arranged to be less than $W/\pi$, where W is the strip width.

I have found that a friction brake assembly, such as is exemplified by assembly 21 on the shaft 15 of drum 14, is effective to counteract the natural torque of the flattened ribbon, to prevent excessively rapid rotation of the drum during extension and/or retraction of the boom, and to minimize interference between drum flange and strip tab end or between successive layers of the strip at the tab end. Thus, strip 10 is readily removed from the storage drum with substantially reduced probability of fouling over that which has attended the operation of prior art deployment systems. Moreover, the structure of the prestressed strip according to my invention assures a reliable interlocked joint approaching the rigidity and strength of a continuous cross-section.

While I have disclosed a specific embodiment of my invention it will be apparent to those skilled in the art that various changes in the specific details of construction and operation shown and described may be resorted to without departing from the true spirit and scope of the invention. I therefore desire that the present invention be limited solely by the appended claims.

I claim:

1. An extendible-collapsible boom system, comprising a strip of resilient material which has been prestressed to form a longitudinal tube of predetermined diameter in the unrestrained state; said strip having a series of spaced tabs along one longitudinal edge thereof and a series of spaced slots, in mating alignment with the tabs, along the opposed longitudinal edge thereof; said predetermined diameter being less than $W/\pi$, where W is the strip width; means for storing said strip in an open flattened condition in the form of a coil of successive layers; means for withdrawing said strip longitudinally from the coil to permit said strip to tend to assume a tubular shape; and means for aligning said tabs and said slots as said strip is withdrawn so that each tab is directed toward its respectively associated slot, whereby said tabs and slots successively engage so that the uncoiled strip forms a tube of greater diameter than said predetermined diameter, with a tab-slot interlocking joint.

2. The combination according to claim 1 wherein said means for storing includes a frame and a drum rotatably supported in said frame, and frictional means coupled to said drum to counteract the natural torque of the open flattened ribbon coiled about said drum.

3. The combination according to claim 1 wherein said means for withdrawing includes a rotatable drive sprocket; said strip including a plurality of longitudinally aligned and spaced apertures interiorly of the edges thereof; said drive sprocket including a plurality of projections arranged to mate with said apertures as said sprocket is rotated.

4. The combination according to claim 3 wherein said means for aligning includes a substantially cylindrical mandrel fixed relative to said sprocket; said mandrel being disposed perpendicularly to the axis of said coil and substantially centrally of the width of the open flattened strip; said mandrel having a diameter greater than the diameter of the formed tube and including a channel aligned with said apertures of said strip as said strip is withdrawn from the coil, said channel being arranged to accept said sprocket projections as each mates with an aperture of said strip; said mandrel being adapted to guide said formed tube in a straight line as said strip is withdrawn from the coil.

5. Apparatus for extending and retracting a tube formed from a prestressed strip of resilient material, said strip being prestressed to assume, when unconfined, a hollow cylindrical shape along the longitudinal axis thereof; said strip having a pair of longitudinal edges respectively carrying aligned tabs and slots arranged to interlock to form from said strip a tube having a diameter greater than the diameter of said unconfined hollow cylindrical shape; said apparatus comprising: means for confining said strip in a flattened open state in the form of a rotatable coil; means for unwinding said coil from said means for confining so that the unwound strip tends to assume said unconfined hollow cylindrical shape; and means for guiding the tabs and slots of the unwound strip so as to produce engagement therebetween to provide an interlocked seam for said tube; said means for unwinding including a rotatable sprocket having projections arranged to cooperate with apertures in said strip to withdraw the strip from its coiled position and to prevent rotation of the strip during formation of said tube.

6. The combination according to claim 5 wherein said means for confining includes means for resisting the torque exerted by said coil to prevent premature unwinding of said strip.

References Cited

UNITED STATES PATENTS

| | | | |
|---|---|---|---|
| 2,130,993 | 9/1938 | Dubilier | 52—108 |
| 3,144,104 | 8/1964 | Weir et al. | 52—108 |
| 3,144,215 | 8/1964 | Klein | 242—54 |
| 3,243,132 | 3/1966 | Taylor et al. | 242—54 |

WILLIAM S. BURDEN, *Primary Examiner.*

UNITED STATES PATENT OFFICE
CERTIFICATE OF CORRECTION

Patent No. 3,361,377  January 2, 1968

Edward C. Trexler, Jr.

It is hereby certified that error appears in the above numbered patent requiring correction and that the said Letters Patent should read as corrected below.

Column 1, line 12, after "2457)." insert -- Rights to practice the invention for any use primarily related to aeronautical and space applications are available through the National Aeronautics and Space Administration. --.

Signed and sealed this 28th day of January 1969.

(SEAL)
Attest:

Edward M. Fletcher, Jr.  
Attesting Officer

EDWARD J. BRENNER  
Commissioner of Patents